May 27, 1924.
K. BERGER
VALVE
Filed Feb. 28, 1923
1,495,241
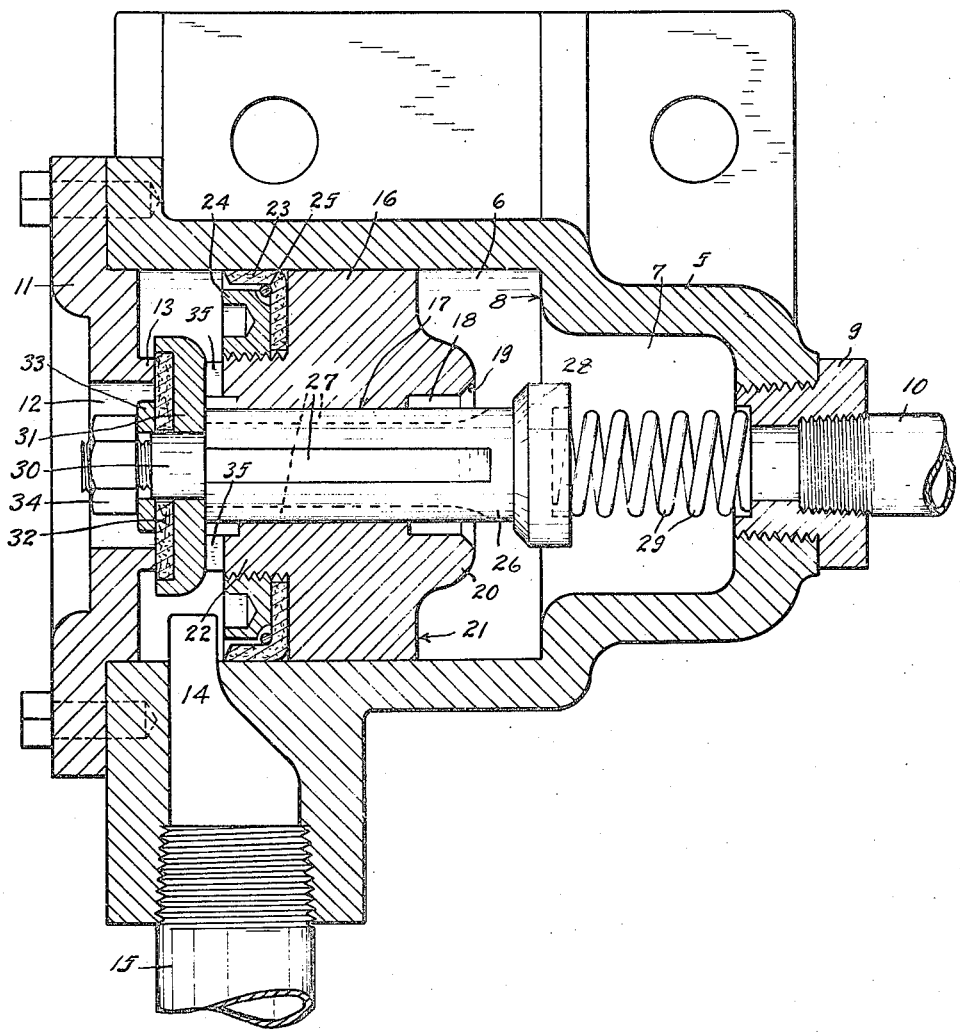
INVENTOR
Knute Berger
BY
Frank Warren
ATTORNEY Patented May 27, 1924.

1,495,241

UNITED STATES PATENT OFFICE.

KNUTE BERGER, OF SEATTLE, WASHINGTON.

VALVE.

Application filed February 28, 1923. Serial No. 621,793.

*To all whom it may concern:*

Be it known that I, KNUTE BERGER, a citizen of the United States, residing at Seattle, in the county of King and State of Washington, have invented a certain new and useful Improvement in Valves, of which the following is a specification.

My invention relates to improvements in valves and an object of my invention is to provide a valve that may be interposed in a conduit line through which fluid under pressure is flowing and that will operate automatically to quickly relieve the fluid pressure on the discharge side of the valve if the fluid pressure on the inlet side of the valve is suddenly lowered.

Another object is to provide an automatic quick release valve that is particularly adapted to be interposed between pneumatic cylinders and pressure regulating valves that control the flow of fluid to said cylinders and that do not afford quick relief means but make necessary a relatively slow exhaust of the cylinders.

Other objects are to provide an automatic quick release valve that is simple and efficient in operation and that is entirely automatic in its action and ordinarily requires no attention.

Other and more specific objects will be apparent from the following description taken in connection with the accompanying drawings. I accomplish these objects by devices illustrated in the drawings wherein the figure is a view in longitudinal midsection of a valve constructed in accordance with my invention certain parts being shown in elevation.

Referring to the drawings, throughout which like reference numerals designate like parts, the numeral 5 designates a valve housing provided with an axially arranged internal cavity divided into a piston chamber 6 of larger diameter and a spring chamber 7, of smaller diameter that opens into the piston chamber 6, an annular shoulder 8 being formed at the junction of the piston chamber and spring chamber.

The end of the spring chamber 7 is provided with an internally threaded opening for the reception of a fitting 9 that is connected with a fluid inlet pipe 10. The end of the piston chamber 6 is left open at the time the valve housing is made and is adapted to be closed by a cover plate 11 having a centrally arranged relief outlet opening 12 that is surrounded by an inwardly protruding annular valve seat member 13.

The housing 5 is provided on one side with a normally operative outlet opening 14 which communicates with the forward end of the piston chamber 6 near the cover plate 11 and which may be connected as by a pipe 15 with a pneumatic cylinder, not shown, or other receptacle into which fluid under pressure is to be introduced.

Slidably disposed within the piston chamber 6 is a piston 16 having an axial passageway 17 that is counterbored cylindrically at its rear end as at 18 to afford means for permitting the passage of fluid and is further counterbored conically, as at 19 to form a valve seat. The rear end of the piston may have a smaller outwardly protruding central portion 20 that is arranged to project into the spring chamber 6 when the piston is moved to the right from the position shown, and that leaves, on the rear of the piston, a shoulder 21 arranged to strike against the shoulder 8 in the housing thereby forming a positive stop to limit the rearward movement of the piston.

The front end of the piston is provided with an externally threaded hub 22 over which a cup shaped washer 23 may be passed and on which a disc like nut member 24 may be screwed to hold the cup shaped washer in place. An expansion ring 25 may be used to keep the washer 23 expanded against the inner wall of the chamber 6.

The passageway 17 through the piston 16 is adapted to receive a valve stem 26 having longitudinal grooves 27 in its periphery and having on its rear end a valve member 28 provided with a conical portion adapted to seat on the valve seat 19. A compression spring 29 is interposed between the valve 28 and the fitting 9 as shown.

The valve stem 26 is provided on the forward end with an axial shank 30 of reduced diameter on which is a disc like valve member comprising a dish shaped supporting washer 31, a valve disc 32 of resilient material, a valve disc retaining washer 33 and a nut 34. The valve disc 31 is arranged to be pressed against the valve seat 13 that surrounds the relief outlet opening 12 by the compression spring 29.

The hub portion 22 of the valve is provided with forwardly protruding spaced lugs 35 that abut against the rear wall of the washer 31 and afford notches or passageways therebetween through which air may pass.

In the normal operation of the valve the several parts thereof will be in the position shown and fluid under pressure, as air, entering through the pipe 10 will flow through the grooves 27 and outwardly through the outlet opening 14. If, instead of maintaining the pressure in the pipe 10 the pressure in such pipe is lowered, as by allowing such pressure to exhaust, then the pressure on the inlet side of the piston 16 will drop below the pressure on the outlet side thereof and such piston will be moved to the right thereby first, bringing it into engagement with the valve 28, closing such valve and shutting off the reverse flow of air through the grooves 27, and then compressing the spring 29 and opening the valve 32 that closes the relief outlet opening 12 thus permitting the accumulated pressure in whatever receptacle the pipe is connected with to exhaust quickly through such relief outlet opening 12.

When the pressure on the inlet side of the piston falls below the pressure on the outlet side thereof air will begin to flow through the grooves 27 in a reverse direction, but under ordinary conditions, when the pipe 10 is permitted to exhaust, there will be sufficient excess pressure on the outlet side of the piston 16 to move said piston to the right and close the valve 28, which will shut off the reverse flow of air through the grooves 27 and immediately cause sufficient excess pressure on the outlet side of the piston 16 to compress the spring 29 and open the valve 32 that closes the relief pressure outlet opening 12. As soon as the excess pressure on the outlet side has escaped the spring 29 will close the valve 32 and, when air under pressure is again admitted through the pipe 10 the piston 16 will be moved back into the position shown and will remain there until exhaust again takes place.

The valve may be installed in any conduit line where a quick exhaust is desired which exhaust can not be obtained with the other equipment used, said valve being particularly well adapted to be interposed between pneumatic cylinders or reservoirs of various types and slow exhausting pressure regulator valves that are connected with the same.

The foregoing description and accompanying drawings clearly disclose what I now consider to be a preferred embodiment of the invention but it will be understood that the disclosure is merely illustrative and that such changes in the valve may be made as are within the scope of the following claims.

What I claim is:

1. A valve of the class described embodying a valve housing having a piston chamber that is provided with an inlet opening and with a relief outlet opening and with a normally operative outlet opening, a piston reciprocable in said piston chamber and having passageways through which fluid may flow from one side to the other of said piston, a valve arranged to close said relief outlet opening, yielding means holding said valve closed and another valve rigidly connected with said first named valve and arranged to close the passageways through said piston when said piston is moved against said valve whereby pressure on the discharge side of said piston may sufficiently exceed pressure on the inlet side of said piston to cause said piston to open said first named valve.

2. A valve embodying a valve housing having a piston chamber formed therein said piston chamber having an inlet opening at one end and a relief outlet opening at the opposite end and having normally operative outlet means adjacent said relief outlet opening, a piston movable in said piston chamber and having a passageway therethrough, a valve stem slidably disposed in said passageway, means affording conduits for the flow of fluid through said piston, a relief outlet valve on the outer end of said valve stem arranged to close said relief outlet opening, a valve on the inner end of said valve stem arranged to be engaged by said piston to close the conduits through said piston whereby said piston may move said relief outlet valve into an open position and a spring for yieldingly holding said relief outlet valve closed.

3. A valve embodying a valve housing having a piston chamber formed therein, inlet conduit means connected with one end of said piston chamber, outlet conduit means communicating with said piston chamber near the other end, relief outlet means at the end of said piston chamber opposite said inlet means, a piston movable in said piston chamber and having an axial passageway therethrough, a valve stem slidable in said axial passageway, means affording conduits through said piston around said valve stem, a valve on the outer end of said piston arranged to close said relief outlet means, a valve seat on the inner end of said piston, a valve on the inner end of said valve stem arranged to engage the valve seat on said piston and spring means yieldingly acting on said valve stem to cause said outer valve to close said relief outlet means.

4. A valve embodying a valve housing internally recessed to form a larger piston chamber open at one end and a smaller spring chamber communicating at the other end with the piston chamber and forming a shoulder at the location of its junction therewith, inlet means communicating with said spring chamber, outlet means communicating with the outer end of said piston chamber, a cover plate for the open end of said piston chamber said cover plate having a central relief outlet opening, an inwardly protruding valve seat member extending around said central opening, a piston movably disposed in said piston chamber, and having an axial passageway, a cup like ring on the outer end of said piston, a valve stem slidable in said piston, means forming passageways through which fluid may flow through said piston around said valve stem, a valve on the inner end of said valve stem arranged to seat on said piston to close said passageways, a spring for exerting a pressure against said valve, another valve on the outer end of said valve stem and arranged to seat upon the valve seat on said cover plate and means for preventing said last named valve from closing the passageways through said piston.

In witness whereof, I hereunto subscribe my name this 21st day of February, A. D. 1923.

KNUTE BERGER.